United States Patent
Chang

(10) Patent No.: US 9,326,241 B2
(45) Date of Patent: Apr. 26, 2016

(54) NETWORK SYSTEM AND CONNECTION METHOD THEREOF

(71) Applicant: Delta Networks, Inc., Taoyuan County (TW)

(72) Inventor: Shu-Li Chang, Taoyuan Count (TW)

(73) Assignee: DELTA NETWORKS, INC. (TW)

( * ) Notice: Subject to any disclaimer, the term of this patent is extended or adjusted under 35 U.S.C. 154(b) by 83 days.

(21) Appl. No.: 14/291,944

(22) Filed: May 30, 2014

(65) Prior Publication Data

US 2015/0181522 A1 Jun. 25, 2015

(30) Foreign Application Priority Data

Dec. 25, 2013 (TW) .............................. 102148100 A

(51) Int. Cl.
*H04W 52/02* (2009.01)
(52) U.S. Cl.
CPC ................................ *H04W 52/0222* (2013.01)
(58) Field of Classification Search
None
See application file for complete search history.

(56) References Cited

U.S. PATENT DOCUMENTS

| 8,081,590 | B2 | 12/2011 | Patterson et al. | |
| 2007/0274244 | A1* | 11/2007 | Yoon | H04W 52/0216 370/311 |
| 2008/0043656 | A1* | 2/2008 | Yoon | G06F 1/3209 370/311 |
| 2009/0253443 | A1* | 10/2009 | Bichot | H04W 68/00 455/458 |
| 2010/0109850 | A1* | 5/2010 | Kovach | G08C 17/02 340/10.32 |
| 2012/0011535 | A1* | 1/2012 | Eguchi | H04L 12/4625 725/25 |
| 2012/0045210 | A1* | 2/2012 | Kim | H04L 41/0893 398/66 |
| 2012/0087287 | A1* | 4/2012 | Kim | H04W 52/0216 370/311 |
| 2015/0181522 | A1* | 6/2015 | Chang | H04W 52/0222 370/311 |

FOREIGN PATENT DOCUMENTS

| CN | 101286917 | 10/2008 |
| CN | 101667925 | 3/2010 |

* cited by examiner

*Primary Examiner* — Benjamin H Elliott, IV
(74) *Attorney, Agent, or Firm* — Hauptman Ham, LLP

(57) ABSTRACT

A network system includes a plurality of network groups. Each of the network groups includes at least one node. The at least one node is configured for transmitting a beacon response according to a beacon request transmitted by a new node. When the at least one node of the at least one of the network groups transmits the beacon response, at least another one of the network groups is in a sleep state, and the new node connects with the at least one node of the at least one of the network groups according to the beacon response. A connection method of the network system is also disclosed herein.

22 Claims, 8 Drawing Sheets

NETWORK SYSTEM AND CONNECTION METHOD THEREOF

RELATED APPLICATIONS

This application claims priority to Taiwan Application Serial Number 102148100, filed Dec. 25, 2013, which is herein incorporated by reference.

BACKGROUND

1. Field of Invention

The present invention relates to a network system. More particularly, the present invention relates to a network system having a sleep mechanism.

2. Description of Related Art

With the maturity of network technology, the applications of network systems have become more and more popular in recent years. In order to satisfy users' needs, the number of devices disposed in network systems has gradually increased and become great. For example, with advances in automatic production technology, the number of machines in a factory has increased substantially so that the number of devices need to be connected to the network system also increases.

When a new device intends to join a network system, the new device transmits a beacon request. At this time, each of the nodes within the communication range of the new device transmits a beacon response to inform the new device of information regarding each of the nodes. The new device is thus able to select the optimized connection node among the nodes and transmits an associate request for joining the network system so as to establish a connection with the above-mentioned optimized node.

However, when there are a large number of nodes existing within the communication range of the new device, each of the nodes transmits its individual beacon response after receiving the beacon request from the new device. The beacon responses corresponding to the large number of nodes flood into the network system, resulting in network congestion and channel outage. As a result, the new device is not able to receive the correct beacon responses so that the connection cannot be established successfully.

For the forgoing reasons, there is a need for solving the above-mentioned problem by providing a network system and a connection method thereof.

SUMMARY

An objective of the present invention is to provide a network system and a connection method of the network system. The network system avoids the network collision and congestion caused by the flooding beacon responses when the new node joins the network system and reduces the time taken for joining the network system by the new node by setting part of the network groups in the sleep state.

A network system is provided. The network system comprises a plurality of network groups. Each of the network groups comprises at least one node. The at least one node is configured for transmitting a beacon response according to a beacon request transmitted by a new node. When the at least one node of at least one of the network groups transmits the beacon response, at least another one of the network groups is in a sleep state, and the new node connects with the at least one node of the at least one of the network groups according to the beacon response.

In the foregoing, the network system further comprises a coordinator configured for sending a sleep broadcast so as to inform the at least another one of the network groups of entering the sleep state.

In the foregoing, when a number of the at least one node of any of the network groups reaches a predetermined value, the coordinator sends the sleep broadcast.

In the foregoing, the predetermined value is equal to a greatest number of nodes that can be accommodated by each of the network groups.

In the foregoing, the network groups take turns being in the sleep state.

In the foregoing, a duration of the sleep state is determined based on a plurality of application ends corresponding to the network groups or a number of the network groups.

In the foregoing, the network system comprises a plurality of network groups in the sleep state. Durations of the network groups in the sleep state are different from each other.

The invention provides a connection method of a network system. The connection method comprises transmitting a beacon request by a new node; at least one node of at least one of a plurality of network groups transmitting a beacon response according to the beacon request, and at least another one of the network groups being in a sleep state; and connecting with the at least one node of the at least one of the network groups according to the beacon response by the new node.

In the foregoing, the connection method further comprises sending a sleep broadcast to inform the at least another one of the network groups of entering the sleep state by a coordinator.

In the foregoing, the connection method further comprises determining whether the at least another one of the network groups is necessary to enter the sleep state; and sending the sleep broadcast by the coordinator if the at least another one of the network groups is necessary to enter the sleep state.

In the foregoing, the step of determining whether the at least another one of the network groups is necessary to enter the sleep state further comprises determining whether a number of the at least one node of any of the network groups reaches a predetermined value.

In the foregoing, the predetermined value is equal to a greatest number of the nodes that can be accommodated by each of the network groups.

In the foregoing, the connection method further comprises the network groups take turns to be in the sleep state.

In the foregoing, a duration of the sleep state is determined based on a plurality of application ends corresponding to the network groups or a number of the network groups.

In the foregoing, the network system comprises a plurality of network groups in the sleep state. Durations of the network groups in the sleep state are different from each other.

The invention further provides a network system. The network system comprises a plurality of nodes. At least one of the nodes is configured for transmitting a beacon response according to a beacon request transmitted by a new node. When the at least one of the nodes transmits the beacon response, at least another one of the nodes is in a sleep state, and the new node connects with the at least one of the nodes according to the beacon response.

In the foregoing, the network system further comprises a coordinator configured for sending a sleep broadcast so as to inform the at least another one of the nodes of entering the sleep state.

In the foregoing, when a number of the nodes reaches a predetermined value, the coordinator sends the sleep broadcast.

In the foregoing, the predetermined value is equal to a greatest number of the beacon responses that can be received by the new node.

In the foregoing, the nodes take turns being in the sleep state.

In the foregoing, a duration of the sleep state is determined based on a plurality of application ends corresponding to the nodes or a number of the nodes.

In the foregoing, the network system comprises a plurality of nodes in the sleep state. Durations of the nodes in the sleep state are different from each other.

The invention still provides a connection method of a network system. The connection method comprises transmitting a beacon request by a new node; at least one of a plurality of nodes transmitting a beacon response according to the beacon request, and at least another one of the nodes being in a sleep state; and connecting with the at least one of a plurality of nodes according to the beacon response by the new node.

In the foregoing, the connection method further comprises sending a sleep broadcast to inform the at least another one of the nodes of entering the sleep state by a coordinator.

In the foregoing, the connection method further comprises determining whether the at least another one of the nodes is necessary to enter the sleep state; and sending the sleep broadcast by the coordinator if the at least another one of the nodes is necessary to enter the sleep state.

In the foregoing, the step of determining whether the at least another one of the nodes is necessary to enter the sleep state further comprises determining whether a number of the nodes reaches a predetermined value.

In the foregoing, the predetermined value is equal to a greatest number of the beacon responses that can be received by the new node.

In the foregoing, the nodes take turns to be in the sleep state.

In the foregoing, a duration of the sleep state is determined based on a plurality of application ends corresponding to the nodes or a number of the nodes.

In the foregoing, the network system comprises a plurality of nodes in the sleep state. Durations of the nodes in the sleep state are different from each other.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
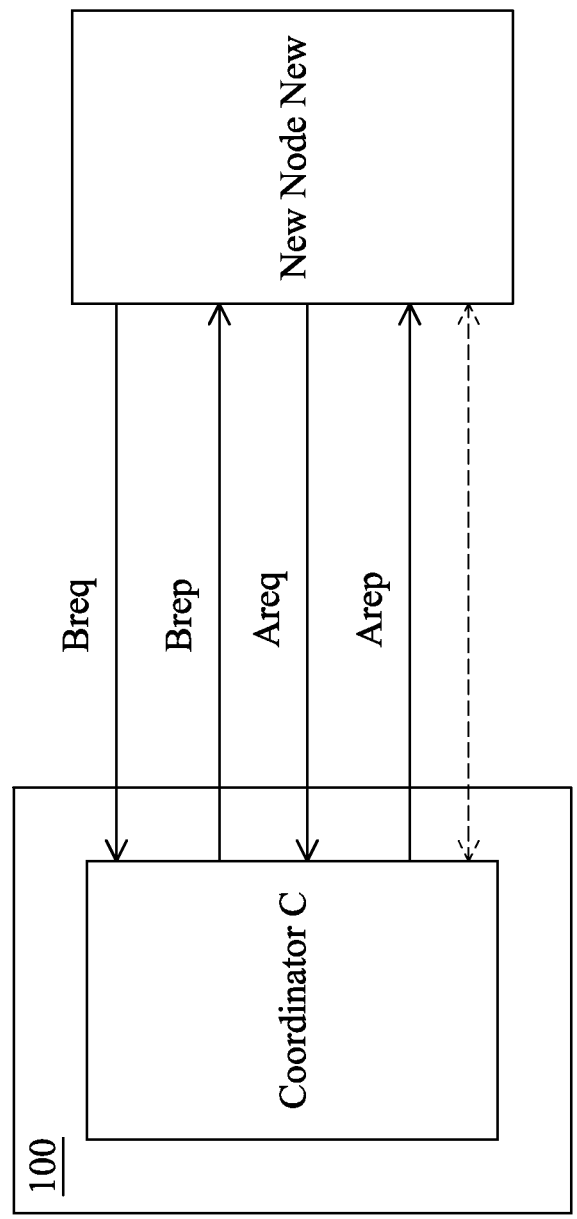
FIG. 1 depicts a schematic diagram of a connecting in a network system according to one embodiment of this invention.

Reference will now be made in detail to the present embodiments of the invention, examples of which are illustrated in the accompanying drawings. However, the embodiments provided herein are intended as illustrative only since numerous modifications and variations therein will be apparent to those skilled in the art. Description of the operation does not intend to limit the operation sequence. Any structures resulting from recombination of components with equivalent effects are within the scope of the present invention. In addition, drawings are only for the purpose of illustration and not plotted according to the original size. Wherever possible, the same reference numbers are used in the drawings and the description to refer to the same or like parts.

Terms used throughout the specification and the claims typically have common meanings for each of the terms used in this field, in the present invention and in special contents, unless specially noted. Some terms for describing the present invention will be discussed in the following or elsewhere in this specification for providing practitioners with additional guidance related to the description of the present invention.

As used herein, "the first", "the second", . . . etc. do not refer to the order or priority, nor are they intended to limit the invention. They are merely used to distinguish the devices or operations described with the same technical terms.

Furthermore, it should be understood that the terms, "comprising", "including", "having", "containing", "involving" and the like, used herein are open-ended (i.e., including but not limited to).

As used herein, both "couple" and "connect" refer to direct physical contact or electrical contact or indirect physical contact or electrical contact between two or more components. Or they can also refer to reciprocal operations or actions between two or more components.

FIG. 1 depicts a schematic diagram of connecting in a network system according to one embodiment of this invention. As shown in FIG. 1, a network system 100 comprises a coordinator C. When a new node New intends to join the network system 100, the new node New transmits a beacon request Breq to the coordinator C first to inform the coordinator C of a connection request. Then, the coordinator C transmits a beacon response Brep to the new node NEW so that the new node New selects the coordinator C to be a connection end according to the beacon response Brep and transmits an associate request Areq for a connection. After that, the coordinator C transmits an associate response Arep to the new node New and confirms the connection.

Figure 2B:
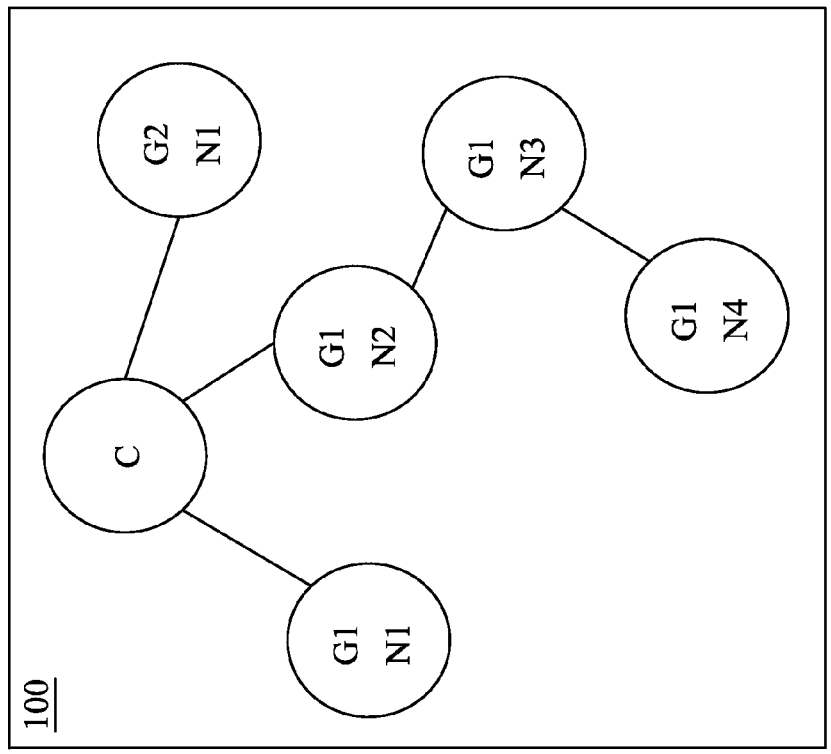
FIG. 2B depicts a schematic diagram of joining a new node to the network system in FIG. 2A according to one embodiment of this invention.
Figure 2A:
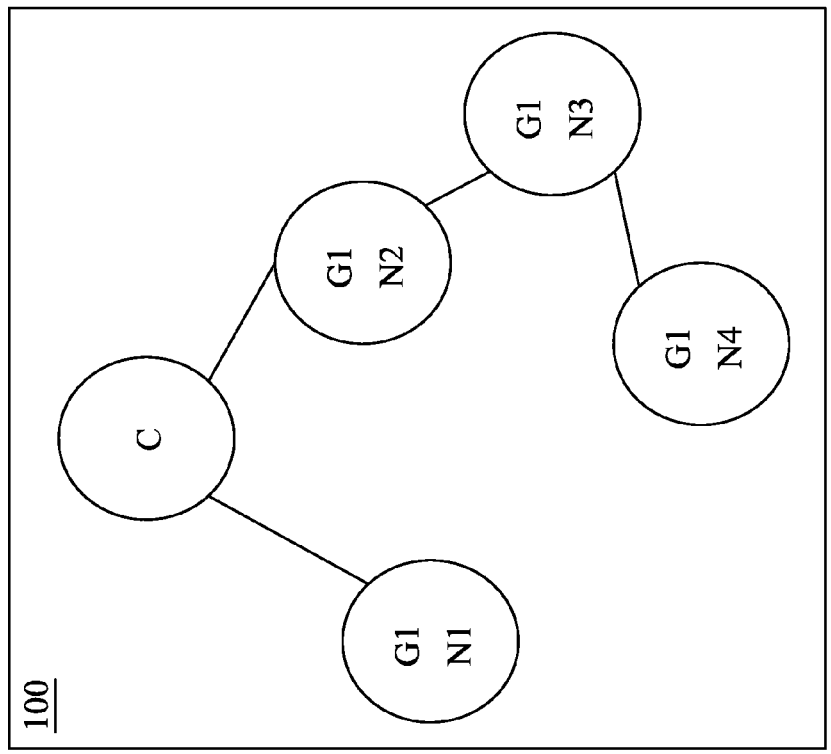
FIG. 2A depicts a schematic diagram of a network system according to one embodiment of this invention.

FIG. 2A depicts a schematic diagram of a network system according to one embodiment of this invention. As shown in FIG. 2A, the network system 100 comprises the coordinator C and a plurality of nodes G1N1-G1N4. The coordinator C and the nodes G1N1-G1N4 are all in a connection state. A detailed description of connecting of the coordinator C and the nodes G1N1-G1N4 is provided as follows.

In an initial state, the network system 100 only comprises the coordinator C. The first node joining the network system 100 is the first node G1N1 of a first network group G1. Since the method that the first node G1N1 joins the network system 100 may be referred to the embodiment shown in FIG. 1, a description is this regard is not provided.

When the second node G1N2 of the first network group G1 intends to join the network system 100, the node G1N2 transmits a beacon request Breq to the coordinator C and the node G1N1 to inform the coordinator C and the node G1N1 of a connection request. Then, the coordinator C and the node G1N1 transmit a beacon response Brep to the node G1N2 to allow the node G1N2 to select an appropriate node (the coordinator C or the node G1N1) according to the beacon response Brep. As shown in FIG. 2A, the node G1N2 selects the coordinator C to be a connection end so as to establish a connection.

It is noted that the above-mentioned selection of the appropriate node is based on a signal strength and a level number the node. For example, the signal transmitted from a node having a smaller distance from the new node will have a higher strength so that the node is suitable to be a connection end.

Similarly, when the third node G1N3 of the first network group G1 and the fourth node G1N4 of the first network group G1 intend to join the network system 100, the third node G1N3 and the fourth node G1N4 respectively transmit beacon requests Breq to the coordinator C and the connected nodes in the network system 100, and select appropriate nodes according to beacon responses Brep. As shown in FIG. 2A, the node G1N3 selects the node G1N2 to be a connection end, and the node G1N4 selects the node G1N3 to be a connection end.

FIG. 2B depicts a schematic diagram of joining a new node to the network system in FIG. 2A according to one embodiment of this invention. In the present embodiment, the first network group G1 can accommodate four nodes. Hence, when the four nodes G1N1-G1N4 of the first network group G1 exist in the network system 100 and a new node intends to join, not only will the coordinator C transmit a beacon response Brep according to a beacon request Breq, but the coordinator C will also transmit network group information (such as a group identifier) to the above new node. The new node thus receives the network group information and belongs to a new network group, and becomes a first node G2N1 of a second network group G2. In addition, since the method that the node G2N1 joins the network system 100 may be referred to the above, a description is this regard is not provided.

In one embodiment, when a number of the nodes of the network group in the network system 100 reaches a predetermined value, the coordinator C sends a sleep broadcast to inform part of the network groups of entering a sleep state. The network group or the network groups in the sleep state thus exit a standby mode, and will not transmit a beacon response Brep to reply a beacon request Breq transmitted from the new node. As a result, a number of the beacon responses Brep received by the new node is reduced. According to one embodiment, the above-mentioned predetermined value is equal to a greatest number of nodes that can be accommodated by the network group.

It is noted that the above sleep broadcast sent by the coordinator C is not limited to a specific network group. In other words, each of the network groups may take turns being in the sleep state as required by practical needs. For example, when the first network group G1 is in the sleep state, the second network group G2 is in the standby mode. When the first network group G1 is in the standby mode, the second network group G2 is in the sleep state.

Figure 3B:
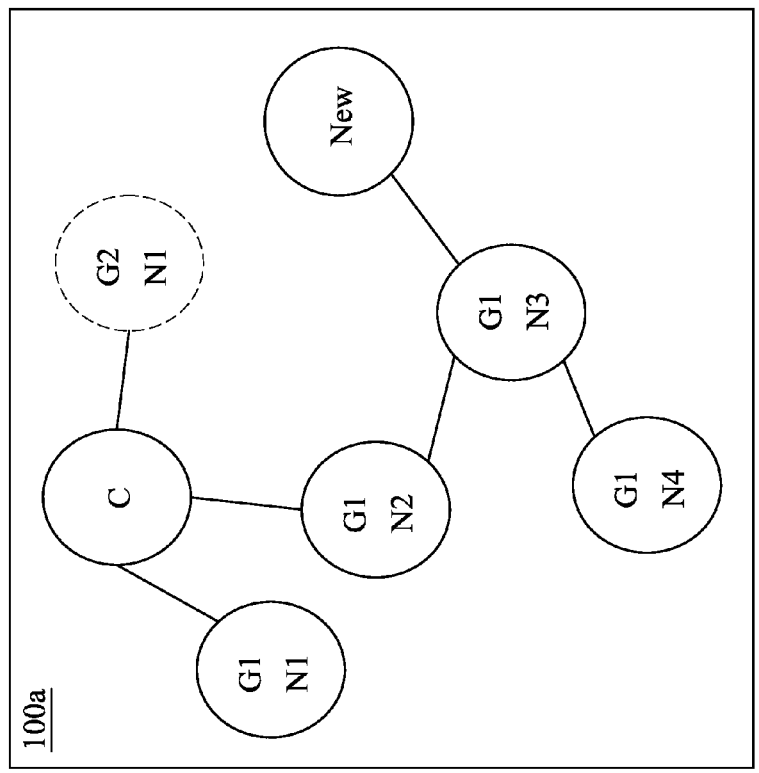
FIG. 3B depicts a schematic diagram of a sleep mechanism and connecting in a network system according to one embodiment of this invention.
Figure 3A:
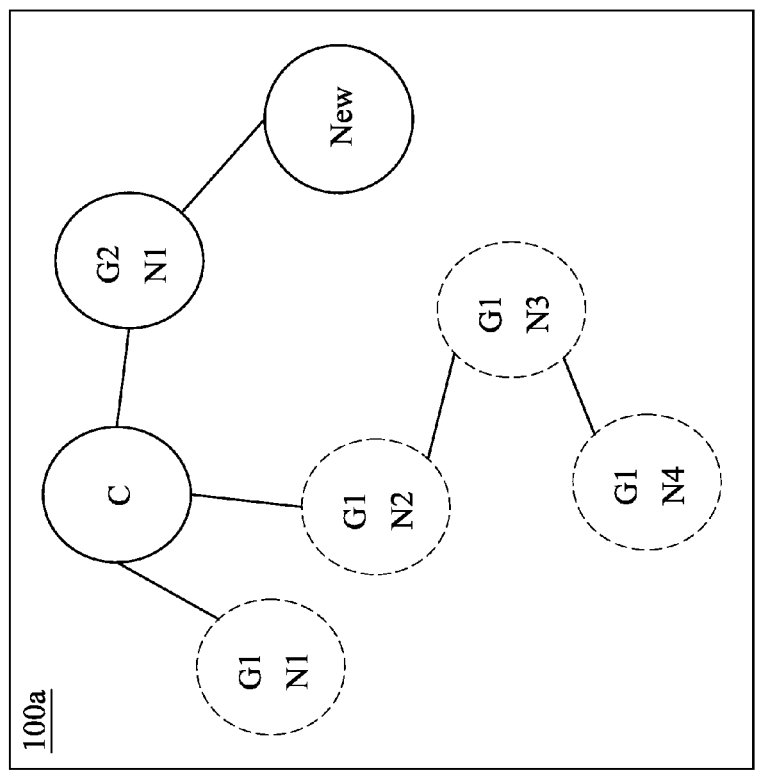
FIG. 3A depicts a schematic diagram of a sleep mechanism and connecting in a network system according to one embodiment of this invention.

The above mechanism that the network groups take turn entering the sleep state may be described with reference to the embodiment shown in FIG. 3A and FIG. 3B. FIG. 3A and FIG. 3B depict schematic diagrams of a sleep mechanism and connecting in a network system according to one embodiment of this invention. In the embodiment shown in FIG. 3A and FIG. 3B, the two network groups G1, G2 exist in a network system 100a, and a number of nodes of the network group G1 has reached a greatest number of nodes that can be accommodated by the network group (that is four nodes). At this time, if a new node New intends to join the network system 100a, the coordinator C sends a sleep broadcast to the network groups so that the two network groups G1, G2 take turns being in a sleep state.

As shown in FIG. 3A, the nodes G1N1-G1N4 of the first network group G1 are in the sleep state, and the coordinator C and the node G2N1 are in a standby mode. Hence, when the new node New intends to join the network system 100a, only the coordinator C and the node G2N1 will transmit a beacon response Brep to the new node New to allow the new node New to select a more appropriate connection end from the coordinator C and the node G2N1 so as to establish a connection.

At this time, if both the coordinator C and the node G2N1 are not within a communication range of the new node New, the new node New cannot receive the beacon responses Brep transmitted from the coordinator C and the node G2N1. As a result, the new node New cannot establish the connection successfully.

After a duration, as shown in FIG. 3B, the nodes G1N1-G1N4 of the first network group G1 are switched to the standby mode and the node G2N1 of the second network group G2 is switched to the sleep state. Under the circumstances, only the coordinator C and the nodes G1N1-G1N4 will transmit a beacon response Brep to the new node New. If the coordinator C and the nodes G1N1-G1N4 are all within the communication range of the new node New, the new node New will select a more appropriate connection end from the coordinator C and the nodes G1N1-G1N4 so as to establish a connection.

In one embodiment, the above-mentioned duration (that is a sleep time of a network group) is determined based on a plurality of application ends corresponding to the network groups or a number of the network groups, and the top priority in duration setting should be not to affect the normal reading of the application ends. For example, if the nodes of the network group are household meters in a building and the household meters read data every fifteen minutes, the duration can be set to ten minutes. In addition, if the data reading interval of the application ends becomes longer, the duration can be lengthened correspondingly so that the node standby time is shortened to achieve energy saving.

Additionally, under the premise that the normal reading of the application ends is not affected, the greater the total number of nodes in a network system is and the greater the number of nodes in a network group is, the longer the duration should be set, and vice versa.

It is noted that a duration in which one of the network groups in the network system enters the sleep state may be different from durations in which the other network groups enter the sleep state. Take FIG. 3A for example, a duration in which the second network group G2 enters the sleep state may be longer than, shorter than, or the same as a duration in which the first network group G1 enters the sleep state.

Figure 4B:
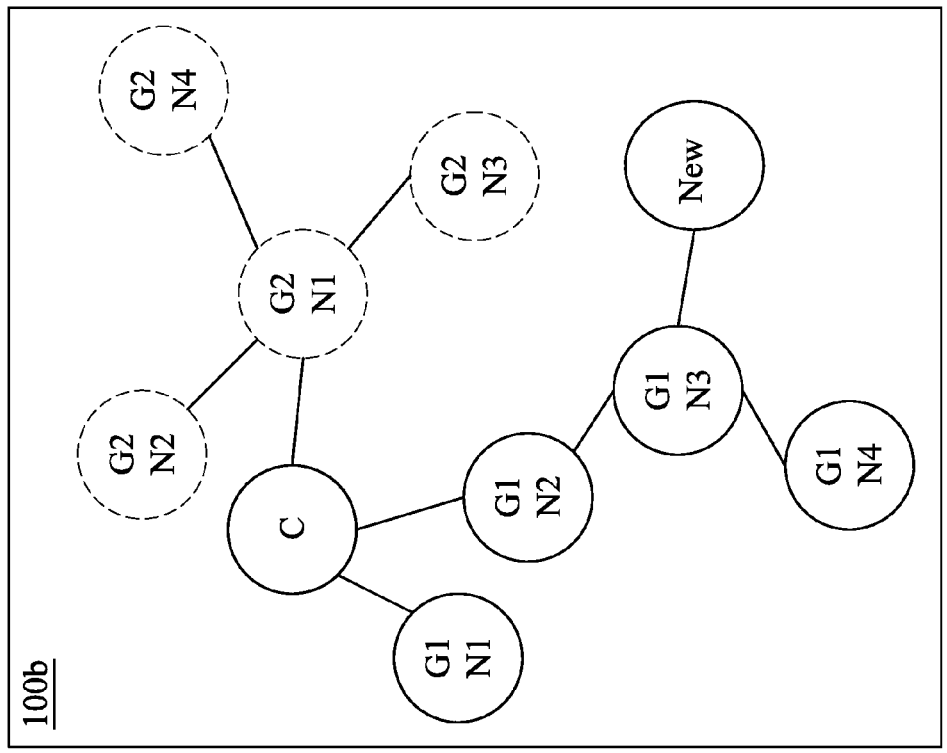
FIG. 4B depicts a schematic diagram of a sleep mechanism and connecting in a network system according to another embodiment of this invention.
Figure 4A:
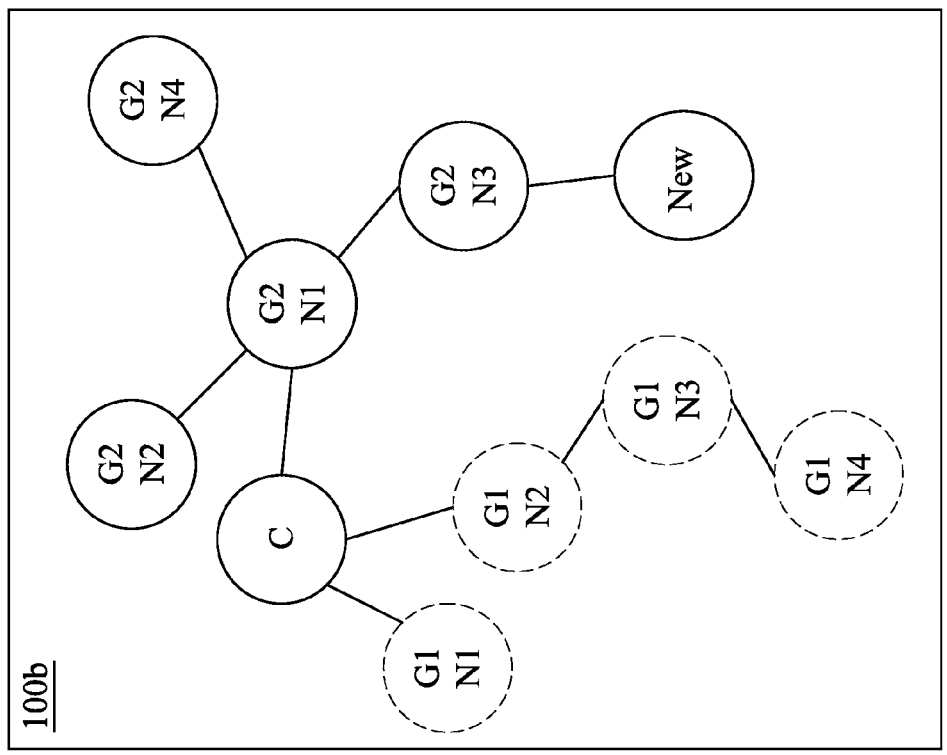
FIG. 4A depicts a schematic diagram of a sleep mechanism and connecting in a network system according to another embodiment of this invention.

The above mechanism that the network groups take turns entering the sleep state may be described with reference to the embodiment shown in FIG. 4A and FIG. 4B. FIG. 4A and FIG. 4B depict schematic diagrams of a sleep mechanism and connecting in a network system according to another embodiment of this invention. In the embodiment shown in FIG. 4A and FIG. 4B, the two network groups G1, G2 exist in a network system 100b, and a number of nodes of the first network group G1 and a number of nodes of the second network group G2 have both reached a greatest number of nodes that can be accommodated by the network group (that is four nodes). At this time, if a new node intends to join the network system 100b, the coordinator C sends a sleep broadcast so that the two network groups G1, G2 take turns being in a sleep state. In addition, the coordinator C also transmits network group information (such as a group identifier) to the above new node. The new node thus receives the network group information and belongs to a new network group, and becomes a first node G3N1 of a third network group G3. Additionally, since the method that the node G3N1 joins the network system 100b may be refer to the above, a description is this regard is not provided.

As shown in FIG. 4A, the nodes G1N1-G1N4 of the first network group G1 are in the sleep state, and the coordinator C and the nodes G2N1-G2N4 of the second network group G2 are in a standby mode. Hence, when the new node New intends to join the network system 100b, only the coordinator C and the nodes G2N1-G2N4 will transmit a beacon response Brep to the new node New to allow the new node New to select a more appropriate connection end from the coordinator C and the nodes G2N1-G2N4 so as to establish a connection. In addition to that, the new node New belongs to the third network group G3 and becomes the first node G3N1 of a third network group G3.

At this time, if the coordinator C and the nodes G2N1-G2N4 are not within a communication range of the new node New, the new node New cannot receive the beacon responses Brep transmitted from the coordinator C and the nodes G2N1-G2N4. As a result, the new node New cannot establish the connection successfully.

After a duration, as shown in FIG. 4B, the coordinator C and the nodes G1N1-G1N4 of the first network group G1 are switched to the standby mode and the nodes G2N1-G2N4 of the second network group G2 are switched to the sleep state. Under the circumstances, only the coordinator C and the nodes G1N1-G1N4 will transmit a beacon response Brep to the new node New. If the coordinator C and the nodes G1N1-G1N4 are all within the communication range of the new node New, the new node New will select a more appropriate connection end from the coordinator C and the nodes G1N1-G1N4 so as to establish a connection. In addition to that, the new node New belongs to the third network group G3 and becomes the first node G3N1 of a third network group G3.

Similarly, the above-mentioned duration is determined based on a plurality of application ends corresponding to the network groups or a number of the network groups, and the top priority in duration setting should be not to affect the normal reading of the application ends. In addition, a duration in which one of the network groups in the network system enters the sleep state may be different from durations in which the other network groups enter the sleep state.

Figure 5:
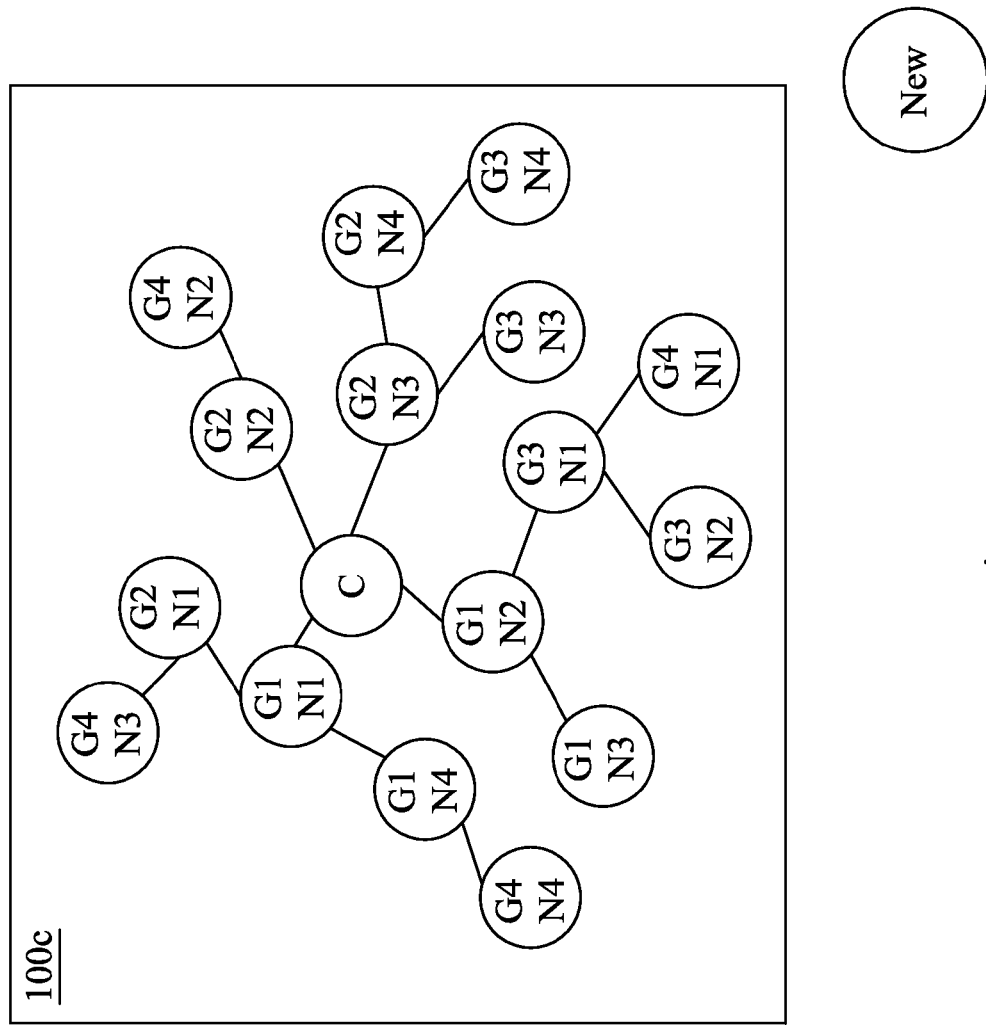
FIG. 5 depicts a schematic diagram of a plurality of network groups in a network system according to one embodiment of this invention.

FIG. 5 depicts a schematic diagram of a plurality of network groups in a network system according to one embodiment of this invention. As shown in FIG. 5, a network system 100c comprises the coordinator C and a plurality of network groups G1-G4. Each of the network groups comprises a greatest number of nodes that can be accommodated by the network group (that is four nodes). When a new node New intends to join the network system 100c, the coordinator C sends a sleep broadcast so that the network groups G1-G4 take turns being in a sleep state.

In one embodiment, the rotating sleep mechanism of the network groups G1-G4 may be that each of the network groups takes its turn to be in the sleep state. For example, first, the network group G1 is in the sleep state and the network groups G2-G4 are in a standby mode. Then, the network group G2 is in the sleep state and the network groups G1, G3, G4 are in the standby mode. After that, the network group G3 is in the sleep state and the network groups G1, G2, G4 are in the standby mode. Finally, the network group G4 is in the sleep state and the network groups G1-G3 are in the standby mode.

At this time, the new node New can receive a total of thirteen beacon responses Brep transmitted from the coordinator C and the nodes of three network groups (the coordinator C transmits one beacon response and the four nodes of each of the network groups respectively transmit four beacon responses). If no sleep mechanism is activated, a number of the beacon responses received should be seventeen. It is understood that the new node New will receive fewer beacon responses under the circumstances that the sleep mechanism is activated as compared with those received when no sleep mechanism is activated, thus easier for the new node New to select an appropriate node so as to establish a connection.

In another embodiment, the rotating sleep mechanism of the network groups G1-G4 may be that two of the network groups take their turns to be in the sleep state simultaneously. For example, first, the network groups G1, G2 are in the sleep state and the network groups G3, G4 are in the standby mode. Then, the network groups G2, G3 are in the sleep state and the network groups G1, G4 are in the standby mode. After that, the network groups G3, G4 are in the sleep state and the network groups G1, G2 are in the standby mode. Finally, the network groups G1, G4 are in the sleep state and the network groups G2, G3 are in the standby mode.

At this time, the now node New only receives a total of nine beacon responses Brep transmitted from the coordinator C and the nodes of two network groups. If no sleep mechanism is activated, the number of the beacon responses received should be seventeen. It is understood that the new node New will receive fewer beacon responses under the circumstances that the sleep mechanism is activated as compared with those received when no sleep mechanism is activated, thus easier for the new node New to select an appropriate node so as to establish a connection.

In still another embodiment, the rotating sleep mechanism of the network groups G1-G4 may be that three of the network groups take their turns to be in the sleep state simultaneously. For example, first, the network groups G1, G2, G3 are in the sleep state. Then, the network groups G2, G3, G4 are in the sleep state. After that, the network groups G1, G3, G4 are in the sleep state, and so forth.

At this time, the now node New only receives a total of a total of five beacon responses Brep transmitted from the coordinator C and the nodes of one network group. If no sleep mechanism is activated, the number of the beacon responses received should be seventeen. It is understood that the new node New will receive fewer beacon responses under the circumstances that the sleep mechanism is activated as compared with those received when no sleep mechanism is activated. In addition, the more the network groups in the sleep state are, the easier the new node New can select an appropriate node so ad to establish a connection.

In one embodiment, when the nodes are sparsely distributed in the network system, fewer groups may be set in the sleep state (for example: each of the network groups takes its turn to be in the sleep state). Therefore, more standby groups are within the communication range of the new node so that the connection speed of the new node to the network system is accelerated.

Conversely, when the nodes are densely distributed in the network system, more groups may be set in the sleep state (for example: three of the network groups take their turns to be in the sleep state simultaneously). Hence, the new node receives fewer beacon responses, it is thus easier for the new node to select an appropriate node so as to establish a connection. As a result, the connection speed of the new node to the network system is accelerated.

In addition, it is noted that FIG. 2A, FIG. 2B, FIG. 3A, FIG. 3B, FIG. 4A, FIG. 4B, and FIG. 5 depict the hierarchy concept in network connecting rather than the actual signal transmission paths. Take the embodiment shown in FIG. 2A for example, if the connection of the node G1N2 is interrupted, the nodes G1N3, G1N4 will repair the path so as to be connected to the coordinator C through another path. As a result, the connection state is maintained.

Figure 6:
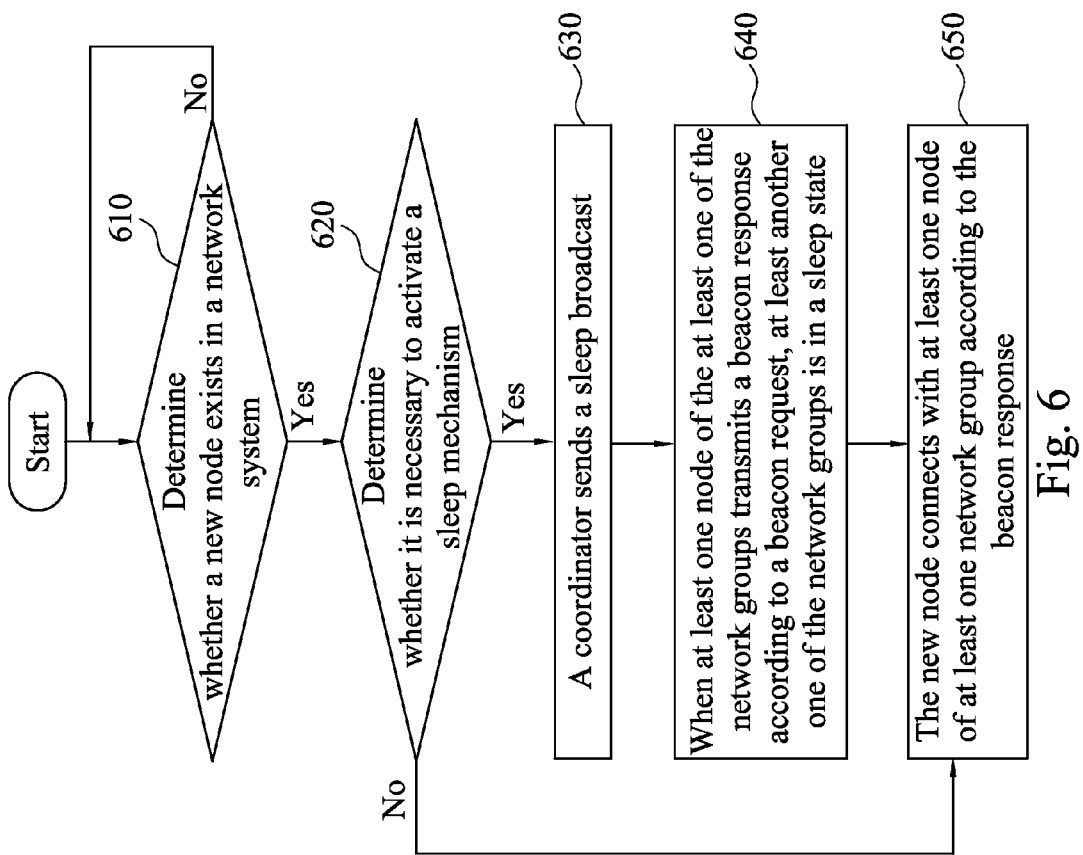
FIG. 6 depicts a flowchart of a connection method of a network system according to one embodiment of this invention.

FIG. 6 depicts a flowchart of a connection method of a network system according to one embodiment of this invention. The connection method of the network system may be applied to the above-mentioned embodiments, but the present invention is not limited in this regard.

First, determine whether a new node exists in a network system (step 610). If the new node exists in the network system, further determine whether it is necessary to activate a sleep mechanism (step 620). If it is not necessary to activate the sleep mechanism, the new node connects with at least one node of at least one network group according to a beacon response (step 650). If it is necessary to activate the sleep mechanism, a coordinator sends a sleep broadcast to the network groups in the network system (step 630). Then, at least one of the network groups is in a standby mode so that at least one node of the at least one of the network groups transmits a beacon response according to a beacon request and at least another one of the network groups is in a sleep state (step 640). Finally, the new node connects with the at least one node of the at least one network group according to the beacon response (step 650).

In one embodiment, the step of determining whether it is necessary to activate the sleep mechanism further comprises that the coordinator sends the sleep broadcast when a number of the at least one node of any of the network groups reaches a predetermined value so that part of the network groups enter the sleep state so as not to transmit beacon responses to the new node.

In another embodiment, the predetermined value is a greatest number of nodes that can be accommodated by the network group.

In still another embodiment, the network groups take turns being in the sleep state. As mentioned previously, the rotating sleep mechanism of the network groups may be that each of the network groups takes its turn to be in the sleep state, two of the network groups take their turns to be in the sleep state simultaneously, or three of the network groups take their turns to be in the sleep state simultaneously.

In yet another embodiment, a duration of the sleep state is determined based on a plurality of application ends corresponding to the network groups or a number of the network groups. As mentioned previously, if the data reading interval of the application ends becomes longer, the duration can be lengthened correspondingly so that the node standby time is shortened to achieve energy saving.

In another embodiment, the duration in which one of the network groups in the network system enters the sleep state may be different from the durations in which the other network groups enter the sleep state so as to achieve a more flexible sleep mechanism.

It should be understood that the sequence of the steps described in the above-mentioned embodiment, unless otherwise specified, may be changed as required by practical needs, or the steps or part of the steps may be performed simultaneously. The flowchart shown in FIG. 6 is only one embodiment and not intended to limit the present invention.

Figure 7:
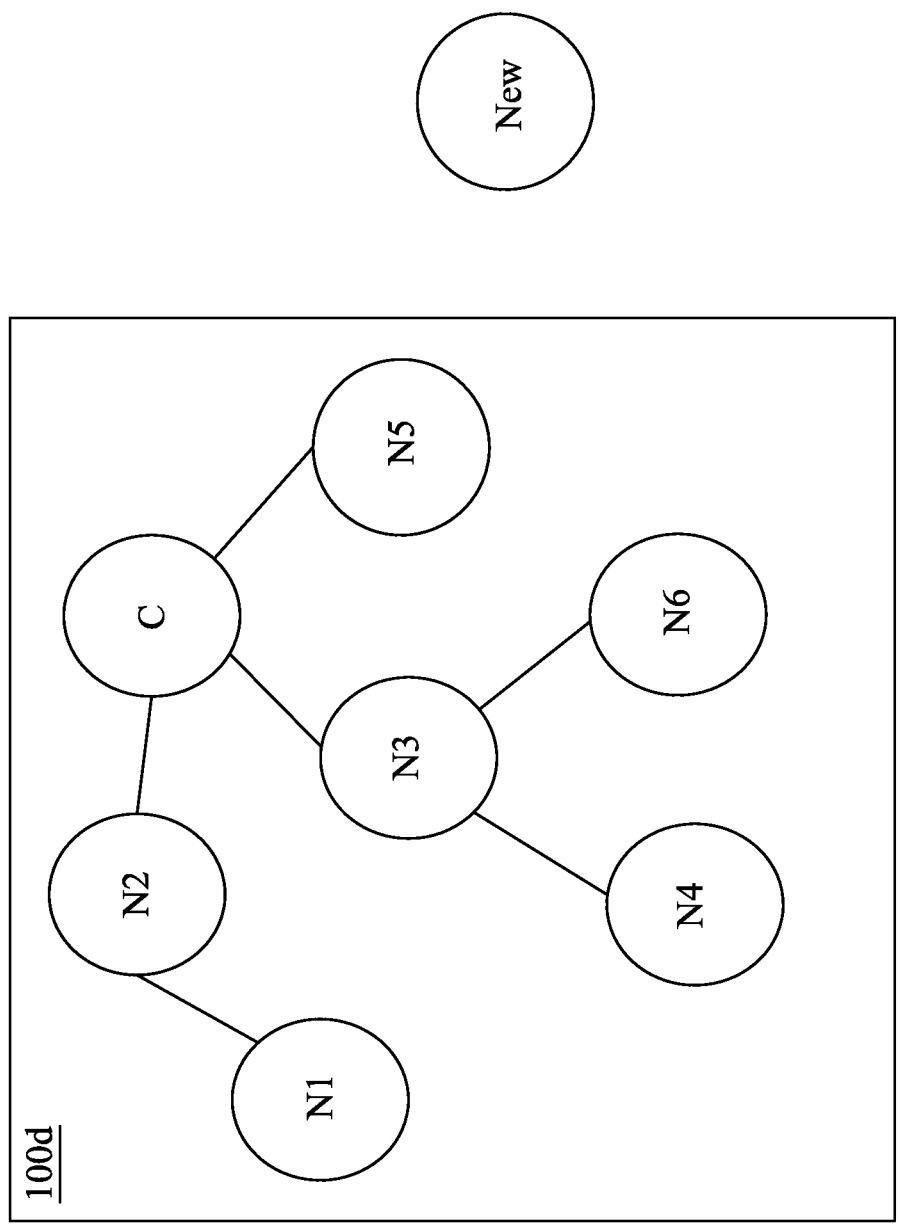
FIG. 7 depicts a schematic diagram of a plurality of nodes in a network system according to another embodiment of this invention.

FIG. 7 depicts a schematic diagram of a plurality of nodes in a network system according to another embodiment of this invention. As shown in FIG. 7, a network system 100d comprises the coordinator C and a plurality of nodes N1-N6. When a new node New intends to join the network system 100d, the coordinator C sends a sleep broadcast so that the nodes N1-N6 take turns being in a sleep state.

In one embodiment, the rotating sleep mechanism of the nodes N1-N6 may be that two of the nodes take their turns to be in the sleep state simultaneously. For example, first, the nodes N1, N2 are in the sleep state and the nodes N3-N6 are in a standby mode. At this time, the new node New only receives beacon responses Brep transmitted from the coordinator C and the nodes N3-N6 generated according to a beacon request Breq to allow the new node New to select an appropriate node according to the above beacon responses Brep so as to establish a connection. If the coordinator C and the nodes N3-N6 are not within a communication range of the new node New, the new node New cannot receive the beacon responses Brep transmitted from the coordinator C and the nodes N3-N6. As a result, the new node New cannot establish the connection successfully.

After a duration, the nodes N3, N4 are in the sleep state and the nodes N1, N2, N5, N6 are in the standby mode. At this time, the new node New only receives beacon responses Brep transmitted from the coordinator C and the nodes N1, N2, N5, N6 generated according to the beacon request Breq to allow the new node New to select an appropriate node according to the above beacon responses Brep so as to establish a connection.

Although the present invention discloses that the rotating sleep mechanism of the nodes is two of the nodes take their turns to be in the sleep state simultaneously, the present invention is not limited in this regard. Those of ordinary skill in the art may select a plurality of nodes to take their turns to be in the sleep state simultaneously as required by practical needs.

It is noted that the above duration is determined based on a plurality of application ends corresponding to the nodes or a number of the nodes, and the top priority in duration setting should be not to affect the normal reading of the application ends. In addition, the duration in which one of the nodes in the network system enters the sleep state may be different from the durations in which the other nodes enter the sleep state.

Additionally, when a number of the nodes in the network system reaches a predetermined value, the coordinator sends a sleep broadcast. In one embodiment, the above predetermined value is equal to a greatest number of beacon responses that can be received by the new node.

Figure 8:
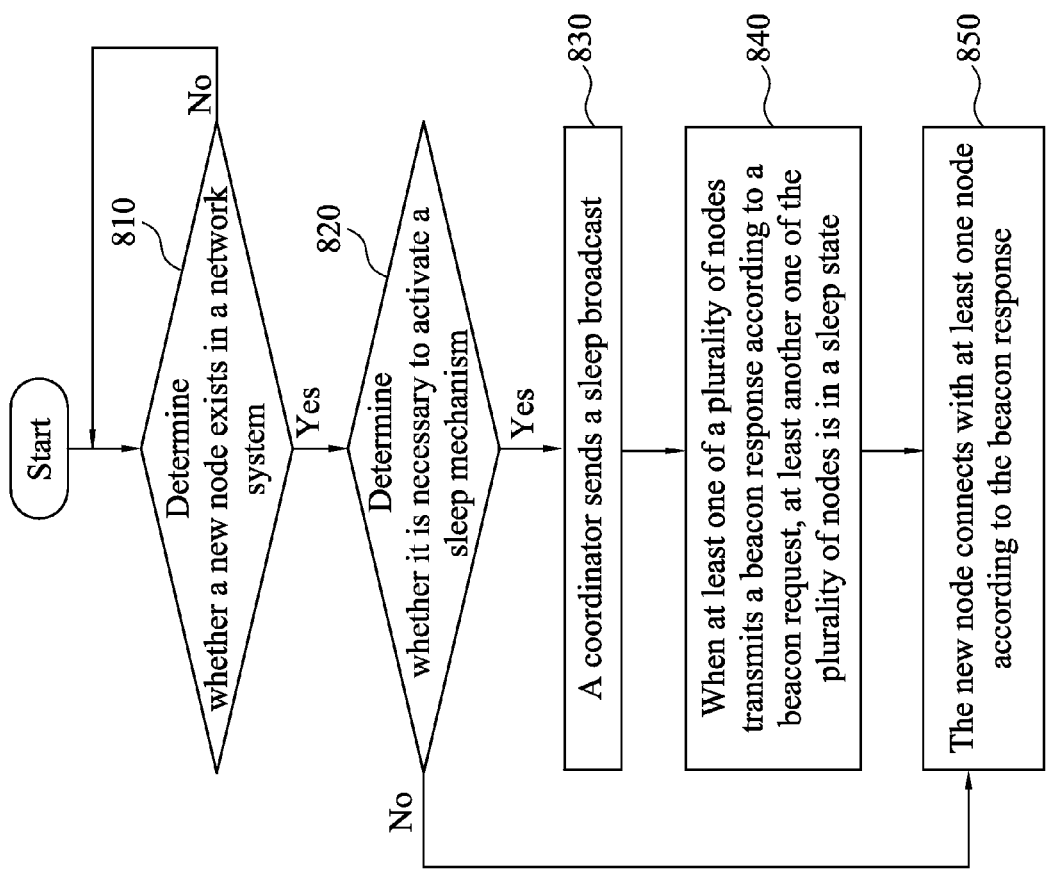
FIG. 8 depicts a flowchart of a connection method of a network system according to another embodiment of this invention.

FIG. 8 depicts a flowchart of a connection method of a network system according to another embodiment of this invention. The connection method of the network system may be applied to the above-mentioned embodiments, but the present invention is not limited in this regard.

First, determine whether a new node exists in a network system (step 810). If the new node exists in the network system, further determine whether it is necessary to activate a sleep mechanism (step 820). If it is not necessary to activate the sleep mechanism, the new node connects with at least one node according to a beacon response (step 850). If it is necessary to activate the sleep mechanism, a coordinator sends a sleep broadcast to the nodes in the network system (step 830). Then, at least one of a plurality of nodes is in a standby mode so that the at least one of the nodes transmits a beacon response according to a beacon request and at least another one of the nodes is in a sleep state (step 840). Finally, the new node connects with the at least one node according to the beacon response (step 850).

In one embodiment, the step of determining whether it is necessary to activate the sleep mechanism further comprises that the coordinator sends the sleep broadcast when a number of the nodes in the network system reaches a predetermined value so that part of nodes enter the sleep state so as not to transmit beacon responses to the new node.

In another embodiment, the predetermined value is a greatest number of beacon responses that can be received by the new node.

In still another embodiment, the nodes take turns being in the sleep state. Similar to the above, the rotating sleep mechanism of the nodes may be that two of the nodes take their turns to be in the sleep state simultaneously, or a plurality of nodes take their turns to be in the sleep state simultaneously.

In yet another embodiment, a duration of the sleep state is determined based on a plurality of application ends corresponding to the nodes or a number of the nodes. As mentioned previously, if the data reading interval of the application ends becomes longer, the duration can be lengthened correspondingly so that the node standby time is shortened to achieve energy saving.

In another embodiment, the duration in which one of the nodes in the network system enters the sleep state is different from the durations in which the other nodes enter the sleep state so as to achieve a more flexible sleep mechanism.

It should be understood that the sequence of the steps described in the above-mentioned embodiment, unless otherwise specified, may be changed as required by practical needs, or the steps or part of the steps may be performed simultaneously. The flowchart shown in FIG. 8 is only one embodiment and not intended to limit the present invention.

Although the present invention discloses that the sleep broadcast is sent to part of the network groups or part of the nodes by the coordinator, the present disclosure is not limited in this regard. Those of ordinary skill in the art may utilize another node or a network device to send the sleep broadcast as required by practical needs.

In addition, although the present invention discloses that the greatest number of nodes that can be accommodated by each of the network groups is four, the present disclosure is not limited in this regard. Those of ordinary skill in the art may set the greatest number of nodes that can be accommodated by each of the network groups as required by practical needs.

In summary, by activating the sleep mechanism, the present invention network system greatly reduces the network collision and congestion caused by the flooding beacon responses when the new node joins the network system, and reduces the time taken for joining the network system by the new node.

Since the sleep mechanism is only activated when the new node joins the network system, and the duration (sleep time) of the network groups or the nodes can be adjusted based on the number of network groups, the number of nodes, and the application ends corresponding to the network groups or the nodes, the normal function of the network system is not affected by the activation of the sleep mechanism.

Additionally, the number of the network groups or the nodes in the standby mode is decreased when the sleep mechanism is activated, power consumption is thus effectively reduced to achieve energy saving.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A network system comprising:
a plurality of network groups, each of the network groups comprising at least one node, the at least one node being configured to transmit a beacon response according to a beacon request transmitted by a new node; and
a coordinator,
wherein
the new node is configured to connect with the at least one node of the at least one of the network groups according to the beacon response transmitted by the at least one node of at least one of the network groups at a time during which at least another one of the network groups is in a sleep state, and
the coordinator is configured to send a sleep broadcast so as to inform the at least another one of the network groups of entering the sleep state if a number of the at least one node of any of the network groups reaches a predetermined value.

2. The network system of claim 1, wherein the predetermined value is substantially equal to a greatest number of nodes that can be accommodated by each of the network groups.

3. The network system of claim 1, wherein the network groups are configured to take turns being in the sleep state.

4. The network system of claim 1, wherein a duration of the sleep state is determined based on a plurality of application ends corresponding to the network groups or a number of the network groups.

5. The network system of claim 4, wherein the network system comprises a plurality of network groups in the sleep state, the durations of the network groups in the sleep state are different from each other.

6. A connection method of a network system comprising:
transmitting a beacon request by a new node;
at least one node of at least one of a plurality of network groups transmitting a beacon response according to the beacon request, and at least another one of the network groups being in a sleep state;

connecting with the at least one node of the at least one of the network groups according to the beacon response by the new node;

determining whether the at least another one of the network groups is necessary to enter the sleep state; and sending a sleep broadcast to inform the at least another one of the network groups of entering the sleep state by a coordinator if the at least another one of the network groups is necessary to enter the sleep state.

7. The connection method of claim 6, wherein the step of determining whether the at least another one of the network groups is necessary to enter the sleep state further comprises:

determining whether a number of the at least one node of any of the network groups reaches a predetermined value.

8. The connection method of claim 7, wherein the predetermined value is substantially equal to a greatest number of the nodes that can be accommodated by each of the network groups.

9. The connection method of claim 6, further comprising the network groups taking turns to be in the sleep state.

10. The connection method of claim 6, wherein a duration of the sleep state is determined based on a plurality of application ends corresponding to the network groups or a number of the network groups.

11. The connection method of claim 10, wherein the network system comprises a plurality of network groups in the sleep state, durations of the network groups in the sleep state are different from each other.

12. A network system comprising:

a plurality of nodes, at least one of the nodes being configured to transmit a beacon response according to a beacon request transmitted by a new node; and a coordinator, wherein the new node is configured to connect with the at least one of the nodes according to the beacon response transmitted by the at least one of the nodes at a time during which at least another one of the nodes is in a sleep state, and the coordinator is configured to send a sleep broadcast so as to inform the at least another one of the nodes of entering the sleep state if a number of the nodes reaches a predetermined value.

13. The network system of claim 12, wherein the predetermined value is substantially equal to a greatest number of the beacon responses that can be received by the new node.

14. The network system of claim 12, wherein the nodes are configured to take turns being in the sleep state.

15. The network system of claim 12, wherein a duration of the sleep state is determined based on a plurality of application ends corresponding to the nodes or a number of the nodes.

16. The network system of claim 15, wherein the network system comprises a plurality of nodes in the sleep state, the durations of the nodes in the sleep state are different from each other.

17. A connection method of a network system comprising:

transmitting a beacon request by a new node;

at least one of a plurality of nodes transmitting a beacon response according to the beacon request, and at least another one of the nodes being in a sleep state;

connecting with the at least one of a plurality of nodes according to the beacon response by the new node;

determining whether the at least another one of the nodes is necessary to enter the sleep state; and sending a sleep broadcast to inform the at least another one of the nodes of entering the sleep state by a coordinator if the at least another one of the nodes is necessary to enter the sleep state.

18. The connection method of claim 17, wherein the step of determining whether the at least another one of the nodes is necessary to enter the sleep state further comprises:

determining whether a number of the nodes reaches a predetermined value.

19. The connection method of claim 18, wherein the predetermined value is substantially equal to a greatest number of the beacon responses that can be received by the new node.

20. The connection method of claim 17, wherein the nodes take turns to be in the sleep state.

21. The connection method of claim 17, wherein a duration of the sleep state is determined based on a plurality of application ends corresponding to the nodes or a number of the nodes.

22. The connection method of claim 21, wherein the network system comprises a plurality of nodes in the sleep state, the durations in which the nodes in the sleep state are different from each other.

* * * * *